(12) United States Patent
Miura

(10) Patent No.: US 12,441,139 B2
(45) Date of Patent: Oct. 14, 2025

(54) TIRE

(71) Applicant: Sumitomo Rubber Industries, Ltd., Kobe (JP)

(72) Inventor: Akiko Miura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/429,612

(22) Filed: Feb. 1, 2024

(65) Prior Publication Data

US 2024/0300266 A1    Sep. 12, 2024

(30) Foreign Application Priority Data

Mar. 6, 2023    (JP) .............................. JP2023-033888

(51) Int. Cl.
*B60C 11/03*    (2006.01)

(52) U.S. Cl.
CPC .......... *B60C 11/03* (2013.01); *B60C 11/0327* (2013.01); *B60C 2011/0353* (2013.01); *B60C 2011/0355* (2013.01); *B60C 2011/039* (2013.01)

(58) Field of Classification Search
CPC ................. B60C 11/03; B60C 11/0306; B60C 2011/0346; B60C 2011/0355; B60C 11/0327; B60C 11/0332
See application file for complete search history.

(56) References Cited

U.S. PATENT DOCUMENTS

| | | |
|---|---|---|
| 9,731,555 B2 | 8/2017 | Tanaka et al. |
| 10,596,855 B2 | 3/2020 | Iwata |
| 2007/0151643 A1* | 7/2007 | Takahashi ........... B60C 11/0306 152/902 |
| 2011/0308680 A1 | 12/2011 | Numata |
| 2014/0110027 A1* | 4/2014 | Kleffmann .............. B60C 11/03 152/209.25 |
| 2014/0230983 A1 | 8/2014 | Tagashira et al. |
| 2014/0238567 A1 | 8/2014 | Iwasaki et al. |
| 2019/0009615 A1 | 1/2019 | Tatsuta et al. |
| 2019/0359003 A1* | 11/2019 | Takano ............... B60C 11/1236 |
| 2020/0122511 A1 | 4/2020 | Kanamura |
| 2021/0300121 A1 | 9/2021 | Ito |

FOREIGN PATENT DOCUMENTS

JP    2012-1120 A    1/2012

OTHER PUBLICATIONS

Extended European Search Report for European Application No. 24156586.0, dated Dec. 5, 2024.

* cited by examiner

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

The tire includes a tread portion provided with a first tread edge, a shoulder circumferential groove, and a shoulder land region. The shoulder land region includes an inner area demarcated axially inside from a center position in the tire axial direction of the shoulder land region, an outer area demarcated axially outside from the center position, and a plurality of shoulder axial grooves extending in the tire axial direction at least in the outer area. In a standard tire load loaded state, an average ground contact pressure in the outer area is larger than an average ground contact pressure in the inner area.

13 Claims, 6 Drawing Sheets

TIRE

RELATED APPLICATIONS

This application claims the benefit of foreign priority to Japanese Patent Application No. JP2023-033888, filed Mar. 6, 2023, which are incorporated by reference in their entirety.

FIELD OF THE INVENTION

The present disclosure relates to a tire.

BACKGROUND OF THE INVENTION

Japanese Unexamined Patent Application Publication No. 2012-1120 describes a pneumatic tire with a tread portion provided with a pair of shoulder circumferential grooves, and a plurality of shoulder axial grooves extending between one of the shoulder circumferential grooves and one of tread ground contact edges. In this pneumatic tire, the average ground contact pressure in a shoulder region demarcated between the shoulder circumferential groove and the tread ground contact edge is from 1.2 to 1.4 times the average ground contact pressure in a crown region demarcated between the shoulder circumferential grooves.

SUMMARY OF THE INVENTION

In recent years, there has been a demand for improved mud performance by increasing the mud scraping force (shearing force) by using shoulder axial grooves. One possible method for increasing the shearing force is, for example, increasing the groove volume of the shoulder axial grooves. However, in order to increase the groove volume, it is necessary to increase the tread rubber volume of the tread portion. Such tires have poorer rolling resistance performance.

The present disclosure was made in view of the above, and a primary object thereof is to provide a tire capable of improving the mud performance while suppressing deterioration of the rolling resistance performance.

The present disclosure is a tire having a tread portion including:
  a first tread edge;
  a shoulder circumferential groove adjacent to the first tread edge; and
  a shoulder land region demarcated between the shoulder circumferential groove and the first tread edge,
  wherein the shoulder land region includes an inner area, an outer area, and a plurality of shoulder axial grooves,
  the inner area is demarcated axially inside from a center position in the tire axial direction of the shoulder land region,
  the outer area is demarcated axially outside from the center position of the shoulder land region,
  each of the shoulder axial grooves is connected with the first tread edge and extends therefrom in the tire axial direction at least in the outer area,
  an average ground contact pressure in the outer area is greater than an average ground contact pressure (Pa) in the inner area under a standard tire load loaded state, and
  the standard tire load loaded state is the state in which the tire is assembled on a standard rim, inflated to a standard inner pressure, loaded with a standard tire load, and in contact with a flat surface with zero camber angle.

By adopting the above configuration, the tire of the present disclosure can improve the mud performance while suppressing the deterioration of the rolling resistance performance.

DETAILED DESCRIPTION OF THE INVENTION

Figure 1:
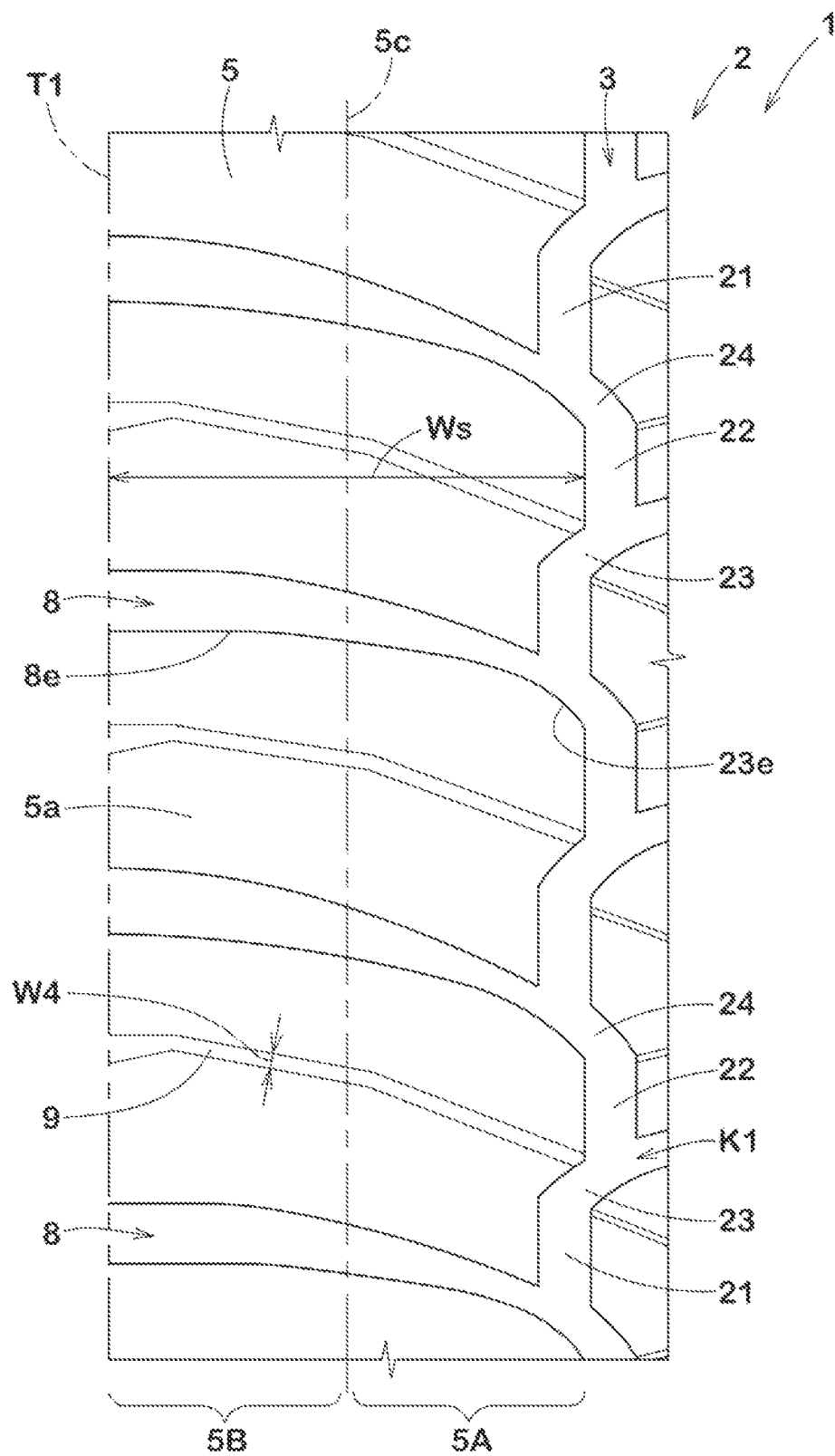
FIG. 1 is a partial plan view showing the tread portion of the tire according to an embodiment of the present disclosure.

An embodiment of the present disclosure will now be described in conjunction with accompanying drawings. The drawings contain exaggerated representations and representations that differ from the actual dimensional ratios of the structure in order to aid in the understanding of the present disclosure. Further, in cases where there are multiple embodiments, the identical or common elements are denoted by the same reference numerals throughout the specification, and redundant explanations will be omitted.

In the present specification, unless otherwise noted, the dimensions and the like of various parts of a tire 1 are the values measured under a standard state. In the case of a pneumatic tire for which various standards have been established, the "standard state" refers to a state in which the tire 1 is assembled on a standard rim, inflated to a standard inner pressure, and loaded with no tire load. In the case of a tire for which various standards are not established, the standard state means a state of standard usage according to the purpose of use of the tire and a state in which the tire is not mounted on a vehicle and is loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

FIG. 1 is a partial plan view of a tread portion 2 of the tire 1 showing an embodiment of the present disclosure. The tire 1 of the present embodiment is suitably used, for example, as a pneumatic tire for a passenger car, specifically, for an SUV that can be driven on muddy terrain. However, the present disclosure may be used, for example, for a heavy duty pneumatic tire, as well as a non-pneumatic tire that are not filled with compressed air inside.

As shown in FIG. 1, the tread portion 2 includes a first tread edge T1, a shoulder circumferential groove 3 adjacent to the first tread edge T1, and a shoulder land region 5 located and demarcated between the shoulder circumferential groove 3 and the first tread edge T1.

The shoulder land region 5 includes an inner area 5A located and demarcated axially inside from a center position (5c) in the tire axial direction of the shoulder land region 5 and an outer area 5B located and demarcated axially outside from the center position (5c) of the shoulder land region 5. The center position (5c) is the axial midpoint of the shoulder land region 5 at its maximum width (Ws) in the tire axial direction.

Further, the shoulder land region 5 includes a plurality of shoulder axial grooves 8 connected to the first tread edge T1 and extend in the tire axial direction at least in the outer area 5B. The shoulder axial grooves 8 communicating with the first tread edge T1 allow mud in the grooves to be smoothly discharged to the outside of the first tread edge T1. As a result, the shoulder axial grooves 8 can grab and compact a lot of mud when newly grounded, therefore, a large sharing force can be exerted.

It is inferred that increasing the shearing force in the axially outer part of the tread portion 2 can stabilize driving in muddy terrain. Therefore, in the present disclosure, the average ground contact pressure (Pb) in the outer area 5B is greater than the average ground contact pressure (Pa) in the inner area 5A under a standard tire load loaded state. As a result, the shoulder axial grooves 8 arranged in the outer area 5B can exert greater shearing force against mud and can discharge mud more smoothly to the outside of the first tread edge T1, therefore, the mud performance is improved. Further, in the inner area 5A, where the average ground contact pressure is relatively small, the amount of heat generated in the rubber forming the inner area 5A and the friction force with the road surface can be reduced, and thus the increase in rolling resistance can be suppressed. Furthermore, in this tire 1, the shearing force can be increased without relying on the groove volume of the shoulder axial grooves 8, and as a result, deterioration of the rolling resistance performance can be suppressed. Therefore, the tire 1 of the present disclosure can improve the mud performance while maintaining the rolling resistance performance.

The "standard tire load loaded state" is the state in which the tire 1 in the standard state is in contact with a flat surface with zero camber angle. In the case of a pneumatic tire for which various standards have been established, the "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of a tire for which various standards are not established and a non-pneumatic tire, the "standard tire load" refers to the load acting on a single tire when the tire is in a standard mounting state. The "standard mounting state" refers to a state in which the tire is mounted on a standard vehicle according to the intended use of the tire, and the vehicle is at rest on a flat road surface in a roadworthy condition.

In the present specification, the "average ground contact pressure" is defined as the average of the pressure (kPa) acting on a ground contacting surface (2a) (shown in FIG. 2) of the tread portion 2, which can be measured, for example, by observing the ground contacting surface (2a). More specifically, the average ground contact pressure can be measured by using a pressure distribution measuring device available from Tekscan, Inc., for example. This device can measure the ground contact pressure applied to the ground contacting surface (2a) of the tire 1 in the standard tire load loaded state at 1.0 mm intervals in the tire circumferential direction and the tire axial direction, for example. The average ground contact pressure is a value obtained by dividing the sum of the measurement values for each area or each land region measured by the above measuring device at 1.0 mm intervals by the number of measurements.

The tire 1, which has such an average ground contact pressure, can be formed, for example, by manipulating or adjusting the rubber volume of the tread rubber (not shown) of the tread portion 2, or by manipulating or adjusting the strength of the carcass (not shown) or other tire components distributed inside the tread portion 2. The aforementioned "tread rubber" and "tire components" are made of well-known materials, so their description is omitted.

In order to effectively exert such an effect, the average ground contact pressure (Pb) of the outer area 5B is preferably at least 1.1 times, more preferably at least 1.2 times the average ground contact pressure (Pb) of the inner area 5A, and preferably 1.4 or less times, more preferably 1.3 or less times the average ground contact pressure (Pb) of the inner area 5A. Since the average ground contact pressure (Pb) of the outer area 5B is 1.1 or more times the average ground contact pressure (Pa) of the inner area 5A, the shearing force is increased in the outer area 5B, which enables stable running in muddy terrain. Since the average ground contact pressure (Pb) in the outer area 5B is 1.4 or less times the average ground contact pressure (Pa) of the inner area 5A, it is possible that the deterioration of the rolling resistance performance due to the frictional force in the outer area 5B becoming excessively large is suppressed.

Figure 2:
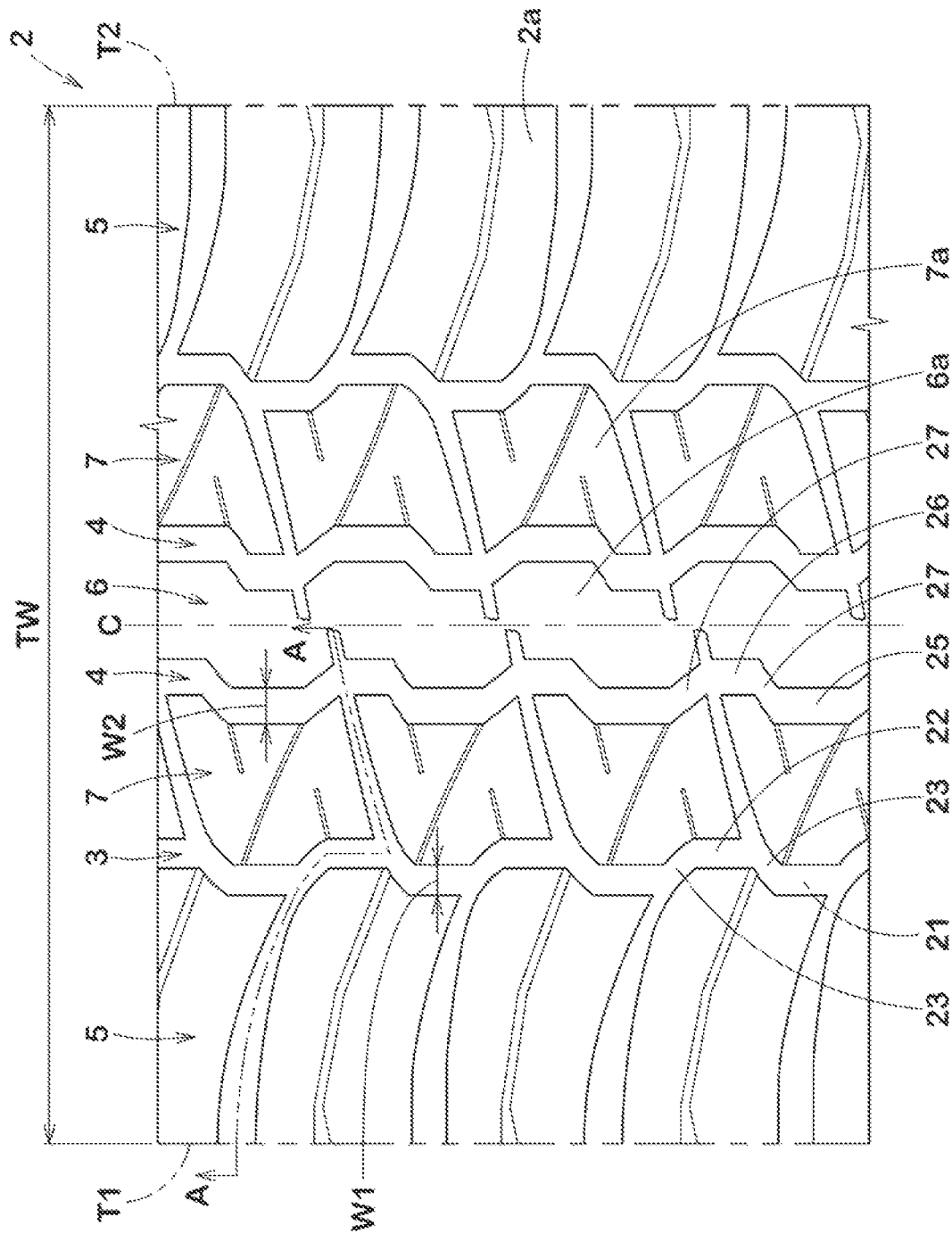
FIG. 2 is a plan view of the tread portion.

FIG. 2 is a plan view of the tread portion 2. As shown in FIG. 2, the tread portion 2 of the present embodiment further includes a second tread edge T2, a pair of crown circumferential grooves 4 adjacent to the tire equator (C) so as to sandwich the tire equator (C), and a crown land region 6 located and demarcated between the pair of the crown circumferential grooves 4. Further, the tread portion 2 includes a middle land region 7 located and demarcated between the shoulder circumferential groove 3 and one of the crown circumferential grooves 4 adjacent to the shoulder circumferential groove 3. It should be noted that the tread portion 2 in the present embodiment is formed by a line symmetrical pattern at the tire equator (C) or a point symmetrical pattern at an arbitrary point on the tire equator (C). Therefore, the tread portion 2 of the present embodiment is provided with another shoulder land region 5 and another middle land region 7 on the second tread edge T2 side of the tire equator (C). And descriptions of another shoulder land region 5 and another middle land region 7 located on the second tread edge T2 side are omitted. The tread portion 2 of the present embodiment has the point-symmetrical pattern. It should be noted that the tire 1 of the present disclosure is not limited to such an embodiment.

The first tread edge T1 and the second tread edge T2 are the axially outermost ground contact positions of the tire 1 in the standard tire load loaded state. Further, the axial distance between the first tread edge T1 and the second tread edge T2 is a tread width TW.

The tire 1 is formed so that the average ground contact pressure P1 of the shoulder land region 5 is larger than the average ground contact pressure P2 of the crown land region 6. The relatively large average ground contact pressure P1 as described above further improves the stability of running in muddy terrain. In order to exert such an effect more effectively, the average ground contact pressure (Pa) of the inner area 5A is set larger than the average ground contact pressure P2 of the crown land region 6 in the present embodiment.

In order to improve the running stability in muddy terrain, the average ground contact pressure P1 of the shoulder land region 5 is preferably at least 1.15 times, more preferably at least 1.2 times the average ground contact pressure P2 of the crown land region 6. In order to suppress the increase in the frictional force and the like of the shoulder land region 5 and suppress the deterioration of the rolling resistance performance, the average ground contact pressure P1 of the shoulder land region 5 is preferably 1.35 or less times, more preferably 1.3 or less times the average ground contact pressure P2 of the crown land region 6.

It is required to suppress the deterioration of the rolling resistance performance caused by excessively high friction forces and the like as well as to improve the running stability in muddy terrain by increasing the shearing force in the land region and/or the area located relatively outside in the tire axial direction. For this reason, the tire 1 is formed so that the average ground contact pressure P3 of the middle land region 7 is smaller than the average ground contact pressure P1 of the shoulder land region 5, and larger than the average ground contact pressure P2 of the crown land region 6. Further, the average ground contact pressure (Pd) of a middle outer area 7B located and demarcated on the axially outer side from a center position (7c) (shown in FIG. 4) of the middle land region 7 is smaller than the average ground contact pressure (Pc) of a middle inner area 7A located and demarcated on the axially inner side from the center position (7c) of the middle land region 7.

The shoulder circumferential groove 3 and the crown circumferential grooves 4 extend continuously in a zigzag shape in the tire circumferential direction, for example. As described above, the shoulder circumferential groove 3 and the crown circumferential groove 4 in the present embodiment have tire axial components, therefore, they can exert a shearing force against mud. The shoulder circumferential groove 3 and the crown circumferential grooves 4 are not limited to such an embodiment, and may extend linearly or in a wavy shape, for example.

The shoulder circumferential groove 3 in the present embodiment includes a plurality of first parts 21, a plurality of second parts 22, a plurality of third parts 23, and a plurality of fourth parts 24. The first parts 21 extend parallel to the tire circumferential direction. The second parts 22 extend parallel to the tire circumferential direction on the axially inner side of the first parts 21. Each of the third parts 23 connects a respective one of the first parts 21 with one of the second parts 22 adjacent thereto and is inclined with respect to the tire circumferential direction. Each of the fourth parts 24 connects a respective one of the first parts 21 with one of the second parts 22 adjacent thereto and is inclined to a side opposite the third parts 23 with respect to the tire circumferential direction. The third parts 23 and the fourth parts 24 are arranged alternately one by one in the tire circumferential direction. Therefore, the shoulder circumferential groove 3 in the present embodiment is formed by units each in which the first part 21, the fourth part 24, the second part 22, and the third part 23 are connected in series in this order.

Each of the crown circumferential grooves 4 includes a plurality of crown first parts 25, a plurality of crown second parts 26, a plurality of crown third parts 27, a plurality of crown fourth parts 28. The crown first parts 25 extend parallel to the tire circumferential direction. The crown second parts 26 extend parallel to the tire circumferential direction on the axially inner side of the crown first parts 25. Each of the crown third parts 27 connects a respective one of the crown first parts 25 and one of the crown second parts 26 adjacent thereto and is inclined with respect to the tire circumferential direction. Each of the crown fourth parts 28 connects a respective one of the crown first parts 25 and one of the crown second parts 26 adjacent thereto and is inclined to a side opposite to the crown third parts 27 with respect to the tire circumferential direction. The crown third parts 27 and the crown fourth parts 28 are arranged alternately one by one in the tire circumferential direction. Therefore, the shoulder circumferential groove 3 in the present embodiment is formed by units each in which the crown first part 25, the crown third part 27, the crown second part 26, and the crown fourth part 28 are connected in series in this order.

Although not particularly limited, the groove width W1 of the shoulder circumferential groove 3 and the groove width W2 of each of the crown circumferential grooves 4 are preferably 5 mm or more, more preferably 6 mm or more, and 9 mm or less, more preferably 8 mm or less, for example. Further, the groove depth D1 (shown in FIG. 3) of the shoulder circumferential groove 3 and the groove depth D2 (shown in FIG. 3) of each of the crown circumferential grooves 4 are preferably 6 mm or more, more preferably 7 mm or more, and preferably 10 mm or less, more preferably 9 mm or less, for example. In the present embodiment, the groove depth D1 of the shoulder circumferential groove 3 is smaller than the groove depth D2 of each of the crown circumferential grooves 4. In the present specification, the "groove width" is the average value of the opening area of the groove on the ground contacting surface (2a) divided by the length of the groove centerline.

As shown in FIG. 1, the shoulder axial grooves 8 connect the first tread edge T1 and the shoulder circumferential groove 3 in the present embodiment. That is, each of the shoulder axial grooves 8 extends from the first tread edge T1 to the shoulder circumferential groove 3 in the present embodiment. Since the shoulder axial grooves 8 configured as such ensure a large axial length, the shearing force against mud can be increased.

Each of the shoulder axial grooves 8 is connected to a respective one of the third parts 23 in the present embodiment. To explain in detail, the shoulder axial grooves 8 are connected to the third parts 23 having tire axial components. Thereby, the shoulder axial grooves 8 and the third parts 23 are brought into contact with the ground at substantially the same time, therefore, a high shearing force can be obtained.

Each of the shoulder axial grooves 8 together with q respective one of the third parts 23 form one groove-shaped body extending in the tire axial direction, for example. This further improves the mud performance. In the present specification, the term "one groove-shaped body" is defined as one in which one of groove edges (8e) of the shoulder axial groove 8 and one of groove edges (23e) of the third part 23 are smoothly connected with each other in a straight line or in an arc, excluding a mode in which the groove edge (8e) and the groove edge (23e) are connected in a bent shaped.

Figure 3:
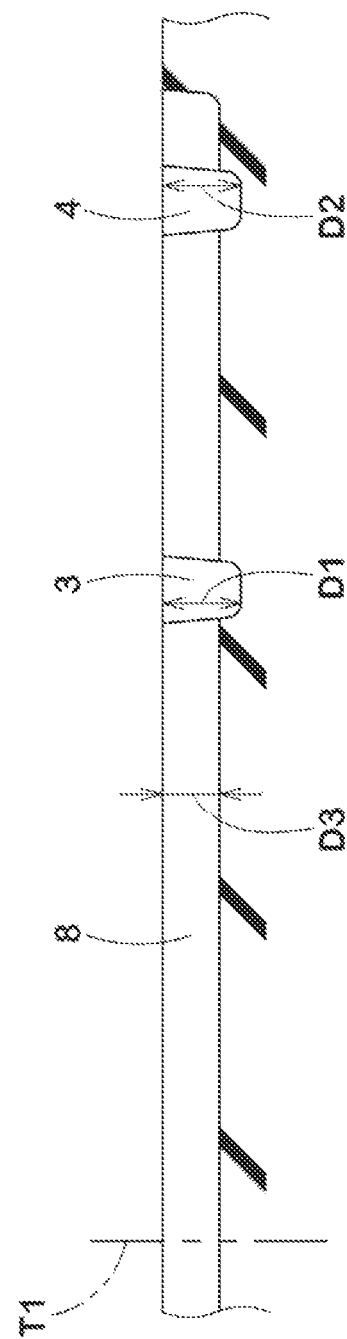
FIG. 3 is a cross section taken along A-A line of FIG. 2.

FIG. 3 is a cross-sectional view taken along A-A line in FIG. 2. As shown in FIG. 3, the groove depth D3 of each of the shoulder axial grooves 8 is smaller than the groove depth D1 of the shoulder circumferential groove 3 and the groove depth D2 of each of the crown circumferential grooves 4. Thereby, the rigidity of the shoulder land region 5 is maintained high. In order to maintain the effect of increasing the shearing force of the shoulder axial grooves 8, it is preferred that the difference between the groove depth D2 of each of the shoulder axial grooves 8 and the groove depth D1 of the shoulder circumferential groove 3 and the difference between the groove depth D2 and the groove depth D1 of each of the crown circumferential grooves 4 are 1.7 mm or less.

As shown in FIG. 1, the shoulder land region 5 includes a plurality of shoulder axial sub grooves 9 each having a groove width W4 smaller than that of each of the shoulder axial grooves 8. The shoulder axial sub grooves 9 configured as such help increase the shearing force against mud and improve the mud performance. In particular, since the groove width W4 of the shoulder axial sub grooves 9 is set from 1 to 2.5 mm, the above-mentioned effect is effectively exerted.

The shoulder axial sub grooves 9 connect the first tread edge T1 and the shoulder circumferential groove 3, i.e., each of the shoulder axial sub grooves 9 extends from the first tread edge T1 to the shoulder circumferential groove 3. That is to say, each of the shoulder axial sub grooves 9 extends from the first tread edge T1 to the shoulder circumferential groove 3 in the present embodiment. Each of the shoulder axial sub grooves 9 of the present embodiment is connected to an intersection position K1 where a respective one of the third parts 23 intersects a respective one of the second parts 22. The intersection positions K1 are positions where the rigidity of the shoulder land region 5 is relatively small. The shoulder axial sub grooves 9 connected to the intersection positions K1 as such deform more when contacting the ground, therefore, mud in the grooves can be smoothly discharged.

If the maximum width (Ws) of the shoulder land region 5 is excessively small, the area of the ground contacting surface (5a) of the shoulder land region 5, which has a relatively large average ground contact pressure, becomes small, and therefore the mud performance may deteriorate. If the maximum width (Ws) of shoulder land region 5 is excessively large, the area of the ground contacting surface (7a) (shown in FIG. 2) of the middle land region 7 and the area of the ground contacting surface (6a) (shown in FIG. 2) of the crown land region 6, which have a relatively small average ground contact pressure, become small, and therefore the rolling resistance performance may deteriorate. For these reasons, the maximum width (Ws) of the shoulder land region 5 is preferably 20% or more, more preferably 22% or more, and preferably 32% or less, more preferably 30% or less of the tread width TW.

Figure 4:
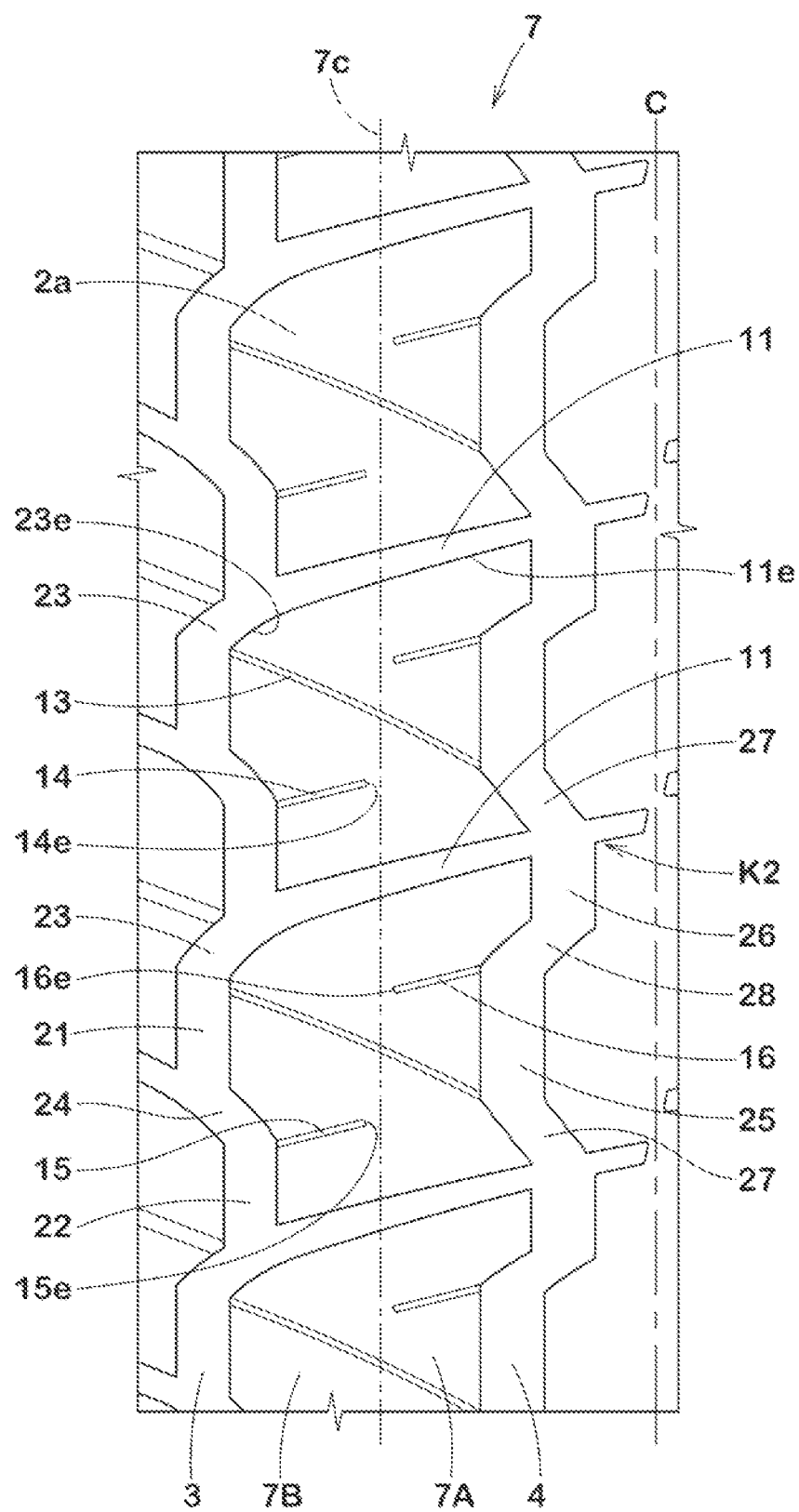
FIG. 4 is a plan view of the middle land region.

FIG. 4 is a plan view of the middle land region 7. As shown in FIG. 4, the middle land region 7 includes a plurality of middle axial grooves 11 each extending from a respective one of the third parts 23 to the crown circumferential grooves 4. Since the middle axial grooves 11 configured as such also contact the ground at substantially the same time as the third parts 23, large shearing forces against mud can be exerted. The middle axial grooves 11 are arranged so as to each form one groove-shaped body extending in the tire axial direction together with a respective one of the third parts 23, for example. In the present embodiment, one of groove edges (11e) of the middle axial groove 11 and one of groove edges (23e) of the third part 23 are smoothly connected by an arc. Further, in the present embodiment, each of the middle axial grooves 11 is connected to an intersection position K2 (crown intersection position) between a respective one of the crown second parts 26 and a respective one of the crown third parts 27.

The middle land region 7 includes first sipes 13 and second sipes 14. Each of the first sipes 13 crosses the middle land region 7. Each of the second sipes 14 has an end portion (14e) terminating within the middle land region 7. The end portion (14e) in the present embodiment is a closed terminating end and not connected with other sipes and grooves. The second sipes 14 consist of outer second sipes 15 connected to the shoulder circumferential groove 3 and inner second sipes 16 connected to the crown circumferential groove 4.

Each of the first sipes 13 in the present embodiment extends from an intersection position (intersection) between a respective one of the first parts 21 and a respective one of the third parts 23 to an intersection position (intersection) between a respective one of the crown first parts 25 and a respective one of the crown third parts 27. Each of the outer second sipes 15 in the present embodiment extends from the intersection position of a respective one of the second parts 22 and a respective one of the fourth parts 24 to have an end portion (15e) terminating axially outside the center position (7c) of the middle land region 7. The end portion (15e) in the present embodiment is a closed terminating end and not connected with other sipes and grooves. Each of the inner second sipes 16 in the present embodiment extends from the intersection position of a respective one of the crown first parts 25 and a respective one of the crown fourth parts 28 to have an end portion (16e) terminating axially inside the center position (7c) of the middle land region 7. The end portion (16e) in the present embodiment is a closed terminating end and not connected with other sipes and grooves. In the present specification, the term "sipe" refers to a cut-like body or an incision having a width of less than 1.0 mm on the ground contacting surface (2a), and is clearly distinguished from a groove having a groove width of 1 mm or more.

Figure 5:
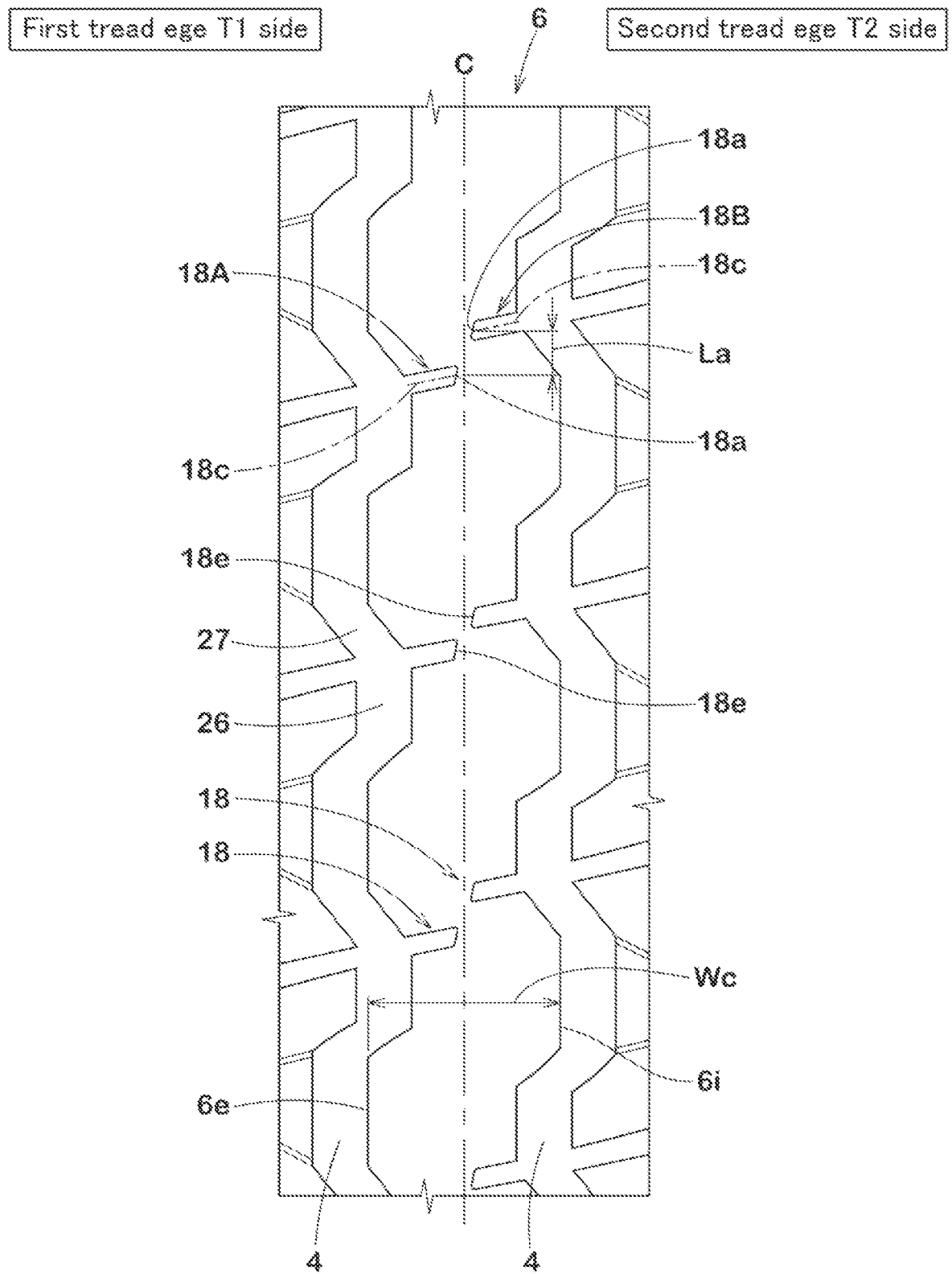
FIG. 5 is a plan view of the crown land region.

FIG. 5 is a plan view of the crown land region 6. As shown in FIG. 5, the crown land region 6 includes a plurality of crown axial grooves 18 each extending from one of the crown circumferential grooves 4 toward the tire equator (C) to have an end portion (18e) terminating to have a closed end within the crown land region 6. Each of the crown axial grooves 18 extends from an intersection position of a respective one of the crown second parts 26 and a respective one of the crown third parts 27, for example.

Figure 6:
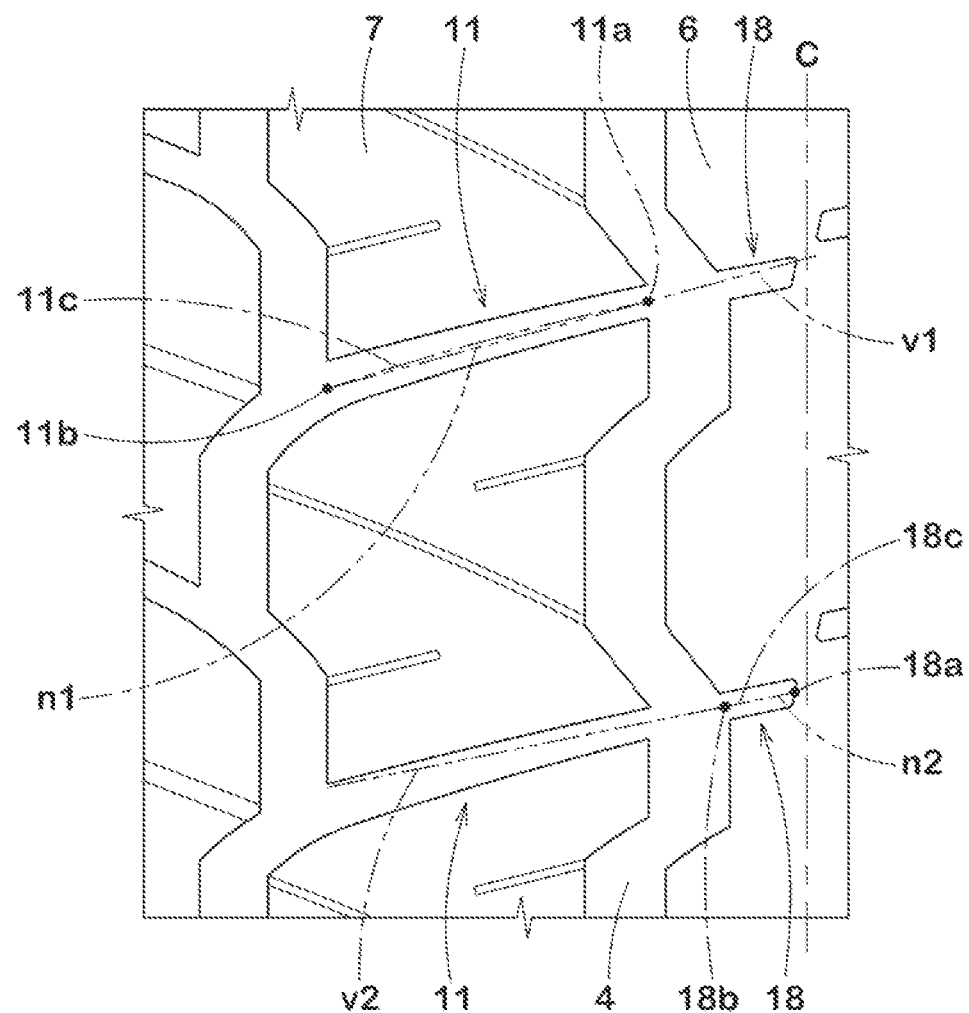
FIG. 6 is an enlarged plan view of the crown land region and the middle land region.

FIG. 6 is an enlarged view of the crown land region 6 and the middle land region 7. As shown in FIG. 6, each of the crown axial grooves 18 is connected with a respective one of the middle axial grooves 11 via the crown circumferential groove 4. Therefore, each of the crown axial grooves 18, a respective one of the crown circumferential grooves 4, and the middle axial grooves 11 form one groove-shaped body extending in the tire axial direction, thereby, a large shearing force is exerted. The term "connected" used in the above description means that a virtual line (v1) is located within the crown axial groove 18, and a virtual line (v2) is located within the middle axial groove 11. The virtual line (v1) is a line segment obtained by extending a linear line (n1) connecting an axially inner end (11a) and an axially outer end (11b) of a groove centerline (11c) of the middle axial groove 11 while maintaining the inclination angle of the linear line (n1). The virtual line (v2) is a line segment obtained by extending a linear line (n2) connecting an axially inner end (18a) and an axially outer end (18b) of a groove centerline (18c) of the crown axial groove 18 while maintaining the inclination angle of the linear line (n2).

As shown in FIG. 5, the crown axial grooves 18 include first crown axial grooves 18A extending from the crown circumferential groove 4 located on the first tread edge T1 side and second crown axial grooves 18B extending from the crown circumferential groove 4 located on the second tread edge T2 side. A length (La) in the tire circumferential direction between each of the first crown axial grooves 18A and one of the second crown axial grooves 18B immediately adjacent thereto is preferably 15% or more, more preferably 20% or more, and preferably 35% or less, more preferably 30% or less of the maximum width (Wc) of the crown land region 6. The length (La) is the distance in the tire circumferential direction between the inner end (18a) of the groove centerline (18c) of the first crown axial groove 18A and the inner end (18a) of the groove centerline (18c) of the second crown axial groove 18B. The maximum width (Wc) of the crown land region 6 is the width in the tire axial direction between a position (6e) of the crown land region 6 closest to the first tread edge T1 and a position (6i) of the crown land region 6 closest to the second tread edge T2.

While detailed description has been made according to an embodiment of the present disclosure, the present disclosure can be embodied in various forms without being limited to the illustrated embodiment.

EXAMPLES

Tires having the basic pattern shown in FIG. 2 were made by way of test according to the specifications listed in Table 1.

Then, each of the test tires was tested for the mud performance and the rolling resistance performance.

The common specifications and test methods for each test tire are as follows.

Tire size: 265/65R18
Tire inner pressure (kPa): 230 (all wheels)
Tire rim: 18×9.0 J
<Mud Performance>

For each test tire, the test tires were mounted on all wheels of a vehicle described below. Then a test driver drove the vehicle on a muddy test course. The test driver evaluated the driving characteristics in terms of steering response, traction, grip, and the like during the drive by sensory evaluation. The results are indicated by an evaluation point based on Reference 1 being 100. The larger the numerical value, the better.

Vehicle: 4-wheel drive passenger car (SUV) with a displacement of 2500 cc
<Rolling Resistance Performance>

The rolling resistance of each of the test tires was measured in accordance with ISO 28580 by using a rolling resistance tester. The results are indicated as an index based on the reciprocal of the value of Reference 1 being 100, wherein the larger the numerical value, the smaller the rolling resistance, which is better. A score of 95 or higher is acceptable.

Tire load: 9.26 kN
Speed: 80 km/h

Test results are shown in Table 1. In each of Examples and Reference of Table 1, the groove depth D1 and the groove depth D2 are the same. Moreover, the average ground contact pressure (Pa) of the inner area is the same in each of Examples and Reference.

TABLE 1 (1/2)

|  | Ref. 1 | Ex. 1 | Ex. 2 | Ex. 3 | Ex. 4 |
| --- | --- | --- | --- | --- | --- |
| Average Ground Contact Pressure (Pb)/ Average Ground Contact Pressure (Pa) | 1.0 | 1.3 | 1.1 | 1.4 | 1.5 |
| Groove Depth D1-Groove Depth D3 [mm] | 1.5 | 1.5 | 1.5 | 1.5 | 1.5 |
| Average Ground Contact Pressure P1/ Average Ground Contact Pressure P2 | 1.0 | 1.2 | 1.2 | 1.2 | 1.2 |
| Mud Performance [evaluation point: larger numerical value is better] | 100 | 130 | 120 | 130 | 130 |
| Rolling Resistance Performance [index: larger numerical value is better] | 100 | 100 | 100 | 100 | 95 |

TABLE 1 (2/2)

|  | Ex. 5 | Ex. 6 | Ex. 7 | Ex. 8 |
| --- | --- | --- | --- | --- |
| Average Ground Contact Pressure (Pb)/ Average Ground Contact Pressure (Pa) | 1.3 | 1.3 | 1.3 | 1.3 |
| Groove Depth D1-Groove Depth D3 [mm] | 1 | 2 | 2.5 | 1.5 |
| Average Ground Contact Pressure P1/ Average Ground Contact Pressure P2 | 1.2 | 1.2 | 1.2 | 1.5 |
| Mud Performance [evaluation point: larger numerical value is better] | 135 | 115 | 110 | 135 |
| Rolling Resistance Performance [index: larger numerical value is better] | 95 | 100 | 105 | 95 |

From the test results, it was confirmed that the tires in the Examples improved the mud performance while suppressing deterioration in the rolling resistance performance.

STATEMENT OF DISCLOSURE

The present disclosure includes the following aspects.

Present Disclosure 1

A tire having a tread portion including:
a first tread edge;
a shoulder circumferential groove adjacent to the first tread edge; and
a shoulder land region demarcated between the shoulder circumferential groove and the first tread edge,
wherein the shoulder land region includes an inner area, an outer area, and a plurality of shoulder axial grooves,
the inner area is demarcated axially inside from a center position in the tire axial direction of the shoulder land region,
the outer area is demarcated axially outside from the center position of the shoulder land region,
each of the shoulder axial grooves is connected with the first tread edge and extends therefrom in the tire axial direction at least in the outer area,
an average ground contact pressure in the outer area is greater than an average ground contact pressure (Pa) in the inner area under a standard tire load loaded state, and
the standard tire load loaded state is the state in which the tire is assembled on a standard rim, inflated to a standard inner pressure, loaded with a standard tire load, and in contact with a flat surface with zero camber angle.

Present Disclosure 2

The tire according to Present Disclosure 1, wherein the average ground contact pressure of the outer area is from 1.1 times to 1.4 times the average ground contact pressure of the inner area.

Present Disclosure 3

The tire according to Present Disclosure 2, wherein the shoulder axial grooves connect the first tread edge and the shoulder circumferential groove.

Present Disclosure 4

The tire according to any one of Present Disclosures 1 to 3, wherein
- the tread portion includes a pair of crown circumferential grooves each adjacent to the tire equator on a respective side thereof, and a crown land region demarcated between the crown circumferential grooves, and
- the shoulder land region has an average ground contact pressure larger than an average ground contact pressure of the crown land region.

Present Disclosure 5

The tire according to Present Disclosure 4, wherein the average ground contact pressure of the shoulder land region is from 1.15 times to 1.35 times the average ground contact pressure of the crown land region.

Present Disclosure 6

The tire according to Present Disclosure 4, wherein each of the shoulder axial grooves has a groove depth smaller than a groove depth of the shoulder circumferential groove and a groove depth of each of the crown circumferential grooves.

Present Disclosure 7

The tire according to Present Disclosure 6, wherein a difference between the groove depth of each of the shoulder axial grooves and the groove depth of the shoulder circumferential groove and a difference between the groove depth of each of the shoulder axial grooves and the groove depth of each of the crown circumferential grooves are 1.7 mm or less.

Present Disclosure 8

The tire according to any one of Present Disclosures 1 to 3, wherein
- the shoulder land region includes a plurality of shoulder axial sub grooves each having a groove width smaller than a groove width of each of the shoulder axial grooves, and
- the shoulder axial sub grooves connect the first tread edge and the shoulder circumferential groove.

Present Disclosure 9

The tire according to Present Disclosure 8, wherein the groove width of each of the shoulder axial sub grooves is from 1 to 2.5 mm.

Present Disclosure 10

The shoulder circumferential groove includes a plurality of first parts, a plurality of second parts, a plurality of third parts, and a plurality of fourth parts,
- the first parts extend parallel to the tire circumferential direction,
- the second parts extend parallel to the tire circumferential direction on the axially inner side of the first parts,
- each of the third parts connects a respective one of the first parts with one of the second parts adjacent thereto and is inclined with respect to the tire circumferential direction,
- each of the fourth parts connects a respective one of the first parts with one of the second parts adjacent thereto and is inclined to a side opposite to the third parts with respect to the tire circumferential direction,
- the third parts and the fourth parts are arranged alternately one by one in the tire circumferential direction, and
- each of the shoulder axial grooves is connected with a respective one of the third parts.

Present Disclosure 11

The tire according to Present Disclosure 10, wherein
- the tread portion includes a pair of crown circumferential grooves and a middle land region,
- the crown circumferential grooves are adjacent to the shoulder circumferential groove on a side opposite to the first tread edge so as to sandwich the tire equator between the crown circumferential grooves,
- the middle land region is demarcated between the shoulder circumferential groove and one of the crown circumferential grooves on the first tread edge side, and
- the middle land region includes a plurality of middle axial grooves each extending from a respective one of the third parts of the shoulder circumferential groove to one of the crown circumferential grooves on the first tread edge side.

Present Disclosure 12

The tire according to Present Disclosure 11, wherein
- the tread portion includes a crown land region demarcated between the crown circumferential grooves,
- the crown land region includes a plurality of crown axial grooves extending from one of the crown circumferential grooves on the first tread edge side toward the tire equator to have end portions terminating to have closed ends within the crown land region, and
- each of the crown axial grooves is connected with a respective one of the middle axial grooves via the crown circumferential groove.

Present Disclosure 13

The tire according to Present Disclosure 2, wherein the average ground contact pressure in the outer area is from 1.2 times to 1.3 times the average ground contact pressure in the inner area.

Present Disclosure 14

The tire according to Present Disclosure 1, wherein the average ground contact pressure in the inner area is larger than an average ground contact pressure in the crown land region.

Present Disclosure 15

The tire according to Present Disclosure 11, wherein an average ground contact pressure in the middle land region is smaller than an average ground contact pressure in the shoulder land region and larger than an average ground contact pressure in the crown land region.

Present Disclosure 16

The tire according to Present Disclosure 11, wherein
the middle land region consists of a middle outer area and a middle inner area,
the middle outer area is demarcated on the axially outer side from a center position in the tire axial direction of the middle land region,
the middle inner area is demarcated on the axially inner side from the center position of the middle land region, and
the middle outer area has an average ground contact pressure smaller than an average ground contact pressure in the middle inner area.

Present Disclosure 17

The tire according to Present Disclosure 4, wherein the shoulder circumferential groove has a groove depth smaller than a groove depth of each of the crown circumferential grooves.

Present Disclosure 18

The tire according to Present Disclosure 10, wherein
the shoulder land region includes a plurality of shoulder axial sub grooves each having a groove width smaller than a groove width of each of the shoulder axial grooves,
the shoulder circumferential groove includes a plurality of intersection positions where the third parts intersect the second parts,
each of the shoulder axial sub grooves extends from the first tread edge to a respective one of the intersection positions of the shoulder circumferential groove.

Present Disclosure 19

The tire according to Present Disclosure 11, wherein
one of the crown circumferential grooves on the first tread edge side includes a plurality of crown first parts, a plurality of crown second parts, a plurality of crown third parts 27, a plurality of crown fourth parts, and crown intersection positions where the crown second parts are connected with the crown third parts,
the crown first parts extend parallel to the tire circumferential direction,
the crown second parts extend parallel to the tire circumferential direction on the axially inner side of the crown first parts,
each of the crown third parts connects a respective one of the crown first parts and one of the crown second parts adjacent thereto and is inclined with respect to the tire circumferential direction,
each of the crown fourth parts connects a respective one of the crown first parts and one of the crown second parts adjacent thereto and is inclined to a side opposite to the crown third parts with respect to the tire circumferential direction,
the crown third parts and the crown fourth parts are arranged alternately one by one in the tire circumferential direction, and
each of the middle axial grooves is connected to a respective one of the crown intersection positions.

Present Disclosure 20

The tire according to Present Disclosure 19, wherein
the tread portion includes a crown land region demarcated between the crown circumferential grooves,
the crown land region includes a plurality of crown axial grooves extending from one of the crown circumferential grooves on the first tread edge side toward the tire equator to have end portions terminating to have closed ends within the crown land region, and
each of the crown axial grooves extends from a respective one of the crown intersection positions.

DESCRIPTION OF REFERENCE SIGNS 1 tire
2 tread portion
3 shoulder circumferential groove
5 shoulder land region
5A inner area
5B outer area
5c center position
8 shoulder axial groove
T1 first tread edge
Pa, Pb average ground contact pressure

The invention claimed is:
1. A tire comprising:
a tread portion having tread edges and provided with circumferentially continuously extending circumferential grooves including
two crown circumferential grooves disposed one on each side of a tire equator, and two shoulder circumferential grooves respectively disposed axially outside the two crown circumferential grooves, so that the tread portion is divided into a crown land region located between the two crown circumferential grooves,
two shoulder land regions located axially outside the two shoulder circumferential grooves, respectively, and
two middle land regions located between the two crown circumferential grooves and the two shoulder circumferential grooves,
wherein
each shoulder land region comprises
a shoulder inner area demarcated axially inside from a center position in the tire axial direction of the shoulder land region, and a shoulder outer area demarcated axially outside from the center position of the shoulder land region, and each middle land region comprises
a middle inner area demarcated axially inside from a center position in the tire axial direction of the middle land region, and
a middle outer area demarcated axially outside from the center position of the middle land region, under a standard loaded state of the tire in which the tire is mounted on a standard rim, inflated to a standard inner pressure, loaded with a standard tire load, and in contact with a flat surface with zero camber angle:

an average ground contact pressure of each shoulder land region is in a range from 1.15 to 1.35 times an average ground contact pressure of the crown land region;

an average ground contact pressure of each middle land region is smaller than the average ground contact pressure of each shoulder land region and larger than the average ground contact pressure of the crown land region;

an average ground contact pressure of said shoulder outer area is in a range from 1.1 to 1.4 times an average ground contact pressure of said shoulder inner area;

the average ground contact pressure of said shoulder inner area is larger than the average ground contact pressure of the crown land region;

an average ground contact pressure of said middle outer area is smaller than an average ground contact pressure of said middle inner area; and each shoulder land region is provided with shoulder axial grooves each extending axially inwardly from the adjacent tread edge at least in the adjacent shoulder outer area.

2. The tire according to claim 1, wherein the shoulder axial grooves connect the axially adjacent tread edge and shoulder circumferential groove.

3. The tire according to claim 1, wherein each of the shoulder axial grooves has a groove depth smaller than a groove depth of each of the shoulder circumferential grooves and a groove depth of each of the crown circumferential grooves.

4. The tire according to claim 3, wherein a difference between the groove depth of each of the shoulder axial grooves and the groove depth of each of the shoulder circumferential grooves and a difference between the groove depth of each of the shoulder axial grooves and the groove depth of each of the crown circumferential grooves is 1.7 mm or less.

5. The tire according to claim 1, wherein
each shoulder land region is provided with a plurality of shoulder axial sub grooves each having a groove width smaller than a groove width of each of the shoulder axial grooves, and
the shoulder axial sub grooves connect the axially adjacent tread edge and shoulder circumferential groove.

6. The tire according to claim 5, wherein the groove width of each of the shoulder axial sub grooves is from 1 to 2.5 mm.

7. The tire according to claim 1, wherein
each shoulder circumferential groove comprises a plurality of first parts, a plurality of second parts, a plurality of third parts, and a plurality of fourth parts,
the first parts extend parallel to the tire circumferential direction,
the second parts extend parallel to the tire circumferential direction on the axially inner side of the first parts,
each of the third parts connects a respective one of the first parts with one of the second parts adjacent thereto and is inclined with respect to the tire circumferential direction,
each of the fourth parts connects a respective one of the first parts with one of the second parts adjacent thereto and is inclined to a side opposite to the third parts with respect to the tire circumferential direction,
the third parts and the fourth parts are arranged alternately one by one in the tire circumferential direction, and
each of the shoulder axial grooves is connected with a respective one of the fourth parts.

8. The tire according to claim 7, wherein
each middle land region is provided with a plurality of middle axial grooves each extending from a respective one of the third parts of the adjacent shoulder circumferential groove to the adjacent crown circumferential groove.

9. The tire according to claim 8, wherein
the crown land region is provided with a plurality of crown axial grooves extending from one of the crown circumferential grooves toward the tire equator and terminating to have closed ends within the crown land region, and
each of the crown axial grooves is continuous with a respective one of the middle axial grooves via the crown circumferential groove.

10. The tire according to claim 1, wherein the average ground contact pressure of the shoulder outer area is from 1.2 times to 1.3 times the average ground contact pressure of the shoulder inner area.

11. The tire according to claim 7, wherein
each shoulder land region is provided with a plurality of shoulder axial sub grooves each having a groove width smaller than a groove width of each of the shoulder axial grooves,
each shoulder circumferential groove comprises a plurality of intersection positions where the third parts intersect the second parts,
each of the shoulder axial sub grooves extends from the adjacent tread edge to a respective one of the intersection positions of the adjacent shoulder circumferential groove.

12. The tire according to claim 8, wherein
each of the crown circumferential grooves comprises a plurality of crown first parts, a plurality of crown second parts, a plurality of crown third parts, a plurality of crown fourth parts, and crown intersection positions where the crown second parts are connected with the crown third parts,
the crown first parts extend parallel to the tire circumferential direction,
the crown second parts extend parallel to the tire circumferential direction on the axially inner side of the crown first parts,
each of the crown third parts connects a respective one of the crown first parts and one of the crown second parts adjacent thereto and is inclined with respect to the tire circumferential direction,
each of the crown fourth parts connects a respective one of the crown first parts and one of the crown second parts adjacent thereto and is inclined to a side opposite to the crown third parts with respect to the tire circumferential direction, the crown third parts and the crown fourth parts are arranged alternately one by one in the tire circumferential direction, and each of the middle axial grooves is connected to a respective one of the crown intersection positions of the adjacent crown circumferential groove.

13. The tire according to claim 12, wherein the crown land region is provided with a plurality of crown axial grooves extending from one of the crown circumferential grooves toward the tire equator and terminating to have closed ends within the crown land region, and each of the crown axial grooves extends from a respective one of the crown intersection positions of the crown circumferential grooves.

* * * * *